United States Patent [19]
Lakshmanan

[11] 4,359,440
[45] Nov. 16, 1982

[54] COEXTRUSION PROCESS FOR PREPARING A COMPOSITE POLYMER FILM CONSTRUCTION

[75] Inventor: Pallavoor R. Lakshmanan, Houston, Tex.

[73] Assignee: Gulf Oil Corporation, Pittsburgh, Pa.

[21] Appl. No.: 313,555

[22] Filed: Oct. 22, 1981

Related U.S. Application Data

[62] Division of Ser. No. 209,812, Nov. 24, 1980, Pat. No. 4,324,872.

[51] Int. Cl.$^3$ ............................................. B32B 31/30
[52] U.S. Cl. ..................................... 264/171; 264/174
[58] Field of Search ................................. 264/171, 174

[56] References Cited

U.S. PATENT DOCUMENTS

| 3,264,272 | 8/1966 | Rees | 260/78.5 |
| 3,485,785 | 12/1969 | Anspon et al. | 260/29.6 |
| 3,553,178 | 1/1971 | Clampitt et al. | 260/80.72 |
| 3,970,626 | 7/1976 | Hurst et al. | 260/29.6 WB |
| 4,152,387 | 5/1979 | Cloeren | 264/171 |
| 4,158,664 | 6/1979 | Selwitz et al. | 260/346.74 |

Primary Examiner—Donald E. Czaja
Assistant Examiner—W. Thompson
Attorney, Agent, or Firm—Richard L. Kelly

[57] ABSTRACT

A process is disclosed for preparing a composite polymer film construction by a coextrusion process. An ethylene polymer or an isotactic propylene polymer is employed to form the surface layers and a blend of an ionomer resin and an alkenyl succinic anhydride is employed to form the intermediate layer.

1 Claim, No Drawings

COEXTRUSION PROCESS FOR PREPARING A COMPOSITE POLYMER FILM CONSTRUCTION

This is a division, of application Ser. No. 209,812 filed Nov. 24, 1980 now U.S. Pat. No. 4,324,872 issued Apr. 13, 1982.

BACKGROUND OF THE INVENTION

Metal salts of copolymers of ethylene with acrylic or methacrylic acid are described in the art as ionomer resins. While such resins have a number of desirable properties, their use is somewhat limited by processing difficulties. In a specific area of application, the ionomer resins are used as coating resins. Many attempts have been made to prepare aqueous dispersions of ionomer resins for use as coating compositions. Considerable difficulties are encountered in making such aqueous dispersions. Accordingly, there is a need in the art for formulating products containing ionomer resins which are easier to process.

SUMMARY OF THE INVENTION

The applicant has discovered novel extrudable, alkali-soluble polymeric compositions consisting of an intimate fusion blend of:
(1) 100 parts by weight of an ionomer resin and
(2) About 5 to 900 parts by weight of an alkenyl succinic anhydride.

The alkenyl group attached to the succinic anhydride will contain about 16-52 carbon atoms. In addition to being readily extrudable, such compositions can be dispersed in aqueous alkaline media to form useful aqueous dispersions for use in preparing coated articles.

DETAILED DESCRIPTION OF THE INVENTION

The compositions of the invention contain about 5 to 900 parts of the alkenyl succinic anhydride (hereinafter sometimes referred to as ASA for brevity of expression) per 100 parts of ionomer resin. The compositions of the invention fall into two fairly distinct classes. The first class contains from about 5 to 100 parts, preferably about 15 to 100 parts, more especially about 20 to 80 parts and ideally about 25 to 50 parts of ASA per 100 parts of ionomer resin. This first class of resins has excellent physical properties approaching those of the ionomer resins themselves. The ASA functions to improve the processing characteristics and particularly the dispersibility of the ionomer resins in aqueous alkaline media. The second class of composition contains from 100 to 900 parts of ASA per 100 parts of the ionomer resin. In this class of materials, the ionomer resin in effect functions to convert the ASA from a nonresinous material into a low cost, film forming composition.

In the preferred embodiments of the invention, the two named components constitute the entire composition. Optionally, however, the compositions may contain up to about 20 weight % of additional components, provided that such optional components do not alter the alkali dispersibility of the compositions of the invention as described infra. An antioxidant of the type conventionally employed with ethylene polymers desirably is included in the compositions.

The ionomer resin included in the blends will be a metal salt of an ethylene-acid copolymer, specifically a copolymer of ethylene and acrylic or methacrylic acid having an acid content of about 1–10 mol %. The ethylene-acid copolymer, in addition to the polymerized ethylene and acid moiety, may contain up to about 10 mol % of additional polymerized monomer moieties such as vinyl acetate, alkyl acrylates, alkyl methacrylates, acrylamide, methacrylamide, and the like. The cation employed in the salt preferably is monovalent such as alkali metal ions, e.g., sodium and potassium ions. Certain polyvalent metal ions can be employed in certain circumstances, e.g., zinc ions. In most cases, it is preferred to employ the metal cation in an amount that is less than stoichiometrically equivalent to the carboxylic acid groups of the ethylene-acid copolymer. Where the preferred quantity of the metal cation is employed, the ionomers can be viewed as being terpolymers containing polymerized ethylene, a salt of the polymerized acid, and the free polymerized acid.

The composition of the ionomer, including its molecular weight, mol % acid content, and cation content, should be adjusted so that the ionomer has a high load melt index (ASTM 1238-70, Condition F) of at least about 1.0. It's feasible to employ ionomers having a normal load melt index (ASTM 1238-70, Condition E) as high as about 50. The preferred ionomer resins will have a normal load melt index in a range of about 1 to 20. Suitable ionomers can be prepared by methods reported in the prior art. See U.S. Pat. Nos. 3,264,272; 3,485,785; and 3,970,626 whose descriptions are incorporated herein by reference. One method consists of preparing an ethylene-acrylic (or methacrylic) acid copolymer and reacting it with sodium hydroxide to convert the desired percentage of carboxylic acid groups to sodium carboxylate groups. Another method involves saponifying an ethylene-alkyl acrylate (or methacrylate) copolymer with an aqueous alkali metal hydroxide solution to form a stable aqueous emulsion of the alkali metal salt of an ethylene-acrylic (or methacrylic) acid copolymer. Such emulsion can be coagulated with carbon dioxide as disclosed in U.S. Pat. No. 3,553,178 to recover the alkali metal salt in a solid form.

The alkenyl succinic anhydride employed in the compositions of the invention are known compounds of the type described in U.S. Pat. No. 4,158,664, whose descriptions are incorporated herein by reference. These compounds are prepared by heating a high molecular weight alpha-olefin containing about 16 or more carbon atoms with maleic anhydride. Their structure is shown below:

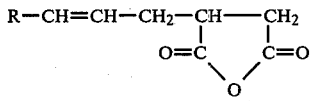

In the above formula, R is an alkyl group containing about 13 to 49 and preferably 15 to 39 carbon atoms. Frequently these compounds are prepared from a mixture of alpha-olefins in which each component contains a minimum of about 16 carbon atoms. In this event, R can be expressed as an average value. The color of the compounds can be improved (lightened) by treatment with water.

The compositions are prepared by malaxating the ionomer resin and the ASA employing conventional equipment such as rubber mills, Banbury mixers, compounding extruders, Brabender Plasticorders and the like. It is preferred practice to first flux the ionomer resin, then add the ASA, and then continue the mixing until a uniform, intimate dispersion of the two components is obtained.

The compositions, particularly those containing less than 100 parts of ASA per 100 parts of ionomer resin, have properties and characteristics similar to the ionomer resin contained therein. They have much higher melt indexes than the ionomer resins and are easily fabricated into coatings and films. They are quite transparent and have good adhesion to paper, aluminum foil, copper foil, ethylene polymers of both the low density and high density types, and isotactic propylene polymers. Accordingly, the compositions are well suited for use in the manufacture of laminated sheet constructions by conventional laminating techniques. The compositions have excellent resistance to a number of solvents, including particularly natural fats, and good vapor barrier properties. The adhesion of such compositions to the principal thermoplastic resins of commercial interest (as measured by peel strength discussed infra) is adequate for most purposes. Thus, they are well suited for use in the manufacture of composite thermoplastic film constructions by coextrusion techniques of the type shown in U.S. Pat. No. 4,152,387, the descriptions of which are incorporated herein by reference.

The compositions of the invention can be readily dispersed in aqueous alkaline media to prepare low viscosity, compositionally uniform dispersions. To prepare such dispersions, at least 10 parts by weight of the compositions and 100 parts by weight of an aqueous alkaline medium are heated and stirred for a time sufficient to disperse the solids of the composition throughout the aqueous medium to form a low viscosity, compositionally uniform dispersion. To prepare such compositions, it is preferred practice to change the aqueous alkaline medium to a vessel provided with a stirrer capable of providing intense agitation. The alkaline medium is heated to an elevated temperature of at least about 75° C. Finely divided particles of the fusion blend of the ionomer and the ASA then are added slowly in small increments. The quantity of alkali included in the alkaline medium will be sufficient to provide pH of at least 9, and preferably at least about 10 in the final dispersion. The alkali employed can be either an inorganic alkali, such as an alkali metal hydroxidle, e.g., sodium hydroxide or potassium hydroxide; or a nitrogenous base such as ammonium hydroxide or an amine such as triethanolamine, 2-dimethylaminoethanol, 2-amino-2-methyl propanol, etc.

When the blend to be dispersed contains less than about 15 parts of ASA per 100 parts of ionomer resin, somewhat more rigorous condition may be required to form the aqueous alkaline dispersions. Specifically, higher temperatures may be required. This, in turn, may require that autogeneous pressures be employed in sealed reactors.

The following examples are set forth to illustrate more clearly the principle and practice of the invention to those skilled in the art. Where parts or percentages are mentioned, they are parts or percentages on a weight basis unless otherwise noted. The materials employed in the examples are described below.

Ionomer resin A was a commercial product sold under the designation Surlyn 1605. This product is reported by the manufacturer to be a sodium salt of an ethylene-methacrylic acid copolymer having a melt index of about 2.8.

Ionomer resin B was a commercial product sold under the designation Surlyn 1555. This product is reported by the manufacturer to be a sodium salt of an ethylene-methacrylic acid copolymer having a melt index of about 14.

Ionomer resin C was a commercial product sold under the designation Surlyn 1652. This product is reported by the manufacturer to be a zinc salt of an ethylene-methacrylic acid copolymer having a melt index of about 5.

Ionomer resin D was a commercial product sold under the designation Surlyn 1605. This product is reported by the manufacturer to be a soium salt of an ethylene-methacrylic acid copolymer having a melt index of about 14.

ASA-A was prepared by condensing an alpha-olefin with maleic anhydride by the procedure described in U.S. Pat. No. 4,158,664. The alpha-olefin employed was a mixture in which the lowest molecular weight component contained 30 carbon atoms. The average number of carbon atoms in the fraction was 38.

ASA-B was prepared by condensing a C-18 alpha-olefin with maleic anhydride by the procedure described in U.S. Pat. No. 4,158,664.

ASA-C was prepared by condensing a C-12 alpha-olefin with maleic anhydride by the procedure described in U.S. Pat. No. 4,158,664.

EXAMPLE 1

A series of intimate fusion blends of the ionomer resins and the alkenyl succinic anhydrides previously described were prepared. These blends were prepared employing a laboratory-size Brabender Plasticorder having a 400-gram mixing head, with the torque-balance arm being set at 3000 meter-grams. The Plasticorder mixing head was heated to a temperature of about 200° C., at which time the unit was started employing a blade speed of 20 rpm. The ionomer resin particles were added in small increments until approximately two-thirds of the desired ionomer resin was fluxed in the apparatus. The ASA then was added in small increments until the entire mass was fluxed. The balance of the ionomer resin then was added and the mixing was continued until the entire mass was fluxed and intimately mixed. The mixture then was cooled and chopped into small particles.

The chopped particles were intimately mixed with powdered dry ice and permitted to stand for approximately 20 minutes. The chilled particles which still contained a quantity of dry ice were charged to a heavy duty Wiley mill fitted with a 3 mm screen. The finely powdered material was recovered and used for testing purposes.

The blends prepared, the melt indexes of the blends, and the stress-strain properties of the materials are shown in Table I. The stress-strain properties of the ionomer resins employed are set forth for comparison purposes.

TABLE I

| Blend Composition | A | B | C | D | E | F | G | H | J | Control A | Control B | Control C | Control D |
|---|---|---|---|---|---|---|---|---|---|---|---|---|---|
| Component | | | | | | | | | | | | | |

TABLE I-continued

| Blend Composition | A | B | C | D | E | F | G | H | J | Control A | Control B | Control C | Control D |
|---|---|---|---|---|---|---|---|---|---|---|---|---|---|
| Ionomer Resin A | 100 | — | — | — | 100 | 100 | 100 | 100 | 100 | 100 | — | — | — |
| Ionomer Resin B | — | 100 | — | — | — | — | — | — | — | — | 100 | — | — |
| Ionomer Resin C | — | — | 100 | — | — | — | — | — | — | — | — | 100 | — |
| Ionomer Resin D | — | — | — | 100 | — | — | — | — | — | — | — | — | 100 |
| ASA - A | 33 | 33 | 33 | 33 | 18 | 54 | 82 | — | — | — | — | — | — |
| ASA - B | — | — | — | — | — | — | — | 18 | — | — | — | — | — |
| ASA - C | — | — | — | — | — | — | — | — | 18 | — | — | — | — |
| Melt Index | 74 | 244 | 62 | 84 | 14 | 183 | 750 | 30 | 56 | 3.5 | 10.4 | 4.0 | 21.1 |
| Tensile @ break, psi | 1990 | 1290 | 1800 | 1730 | 3290 | 1760 | 1320 | 2509 | 2760 | 4190 | 3270 | 3640 | 3760 |
| Tensile @ yield, psi | 1490 | 1080 | 1240 | 1220 | 1780 | 1360 | 1340 | 950 | 1100 | 2210 | 1730 | 1230 | 1670 |
| Elongation @ break, % | 270 | 120 | 350 | 290 | 380 | 240 | 90 | 385 | 345 | 320 | 320 | 430 | 410 |

In analyzing the data, it is noted that all of the compositions have much higher melt indexes than the ionomer resin contained therein. For this reason, the compositions are much easier to extrude than is the ionomer resin. Comparison of the data for Blends A, E, F, and G indicates the manner in which properties vary as the concentration of a specific ASA is varied with Ionomer Resin A. Comparison of the data for Blends E, H, and J indicates that varying the number of carbon atoms in the alkenyl chain of the ASA does not have a major effect on melt index or physical properties when the ASA is blended with Ionomer Resin A.

EXAMPLE 2

A series of aqueous alkaline dispersions were prepared from the finely divided intimate fusion blends of the ionomer resins and ASAs prepared in Example 1.

The disprsions were made in a one liter vessel fitted with a laboratory size Gifford-Woods mixer. The vessel was initially charged with water in the amount of approximately 500 or 600 ml and the quantity of alkali to be employed. In certain of the runs, n-butanol was included as an auxiliary dispersing agent. The alkaline solution was heated to a minimum temperature of 75° C. At this temperature, the finely powdered blends were added slowly and the speed of the agitator was increased. The temperature was gradually increased to at least 90° C., and the powdered blend was continually added in small increments at a rate substantially corresponding to the rate at which the added particles were being dispersed.

In Table II which follows are shown the materials charged to prepare the several dispersions. The processing conditions are shown with the recorded time being the interval between the first addition of the powdered blend and the conclusion of the addition. Two temperatures are shown for each run, with the lower temperature being the temperature at which the first addition of the blend was made and the second temperature being the final temperature employed in the preparation of the dispersion. The emulsion properties shown are the percent solids, the pH, and the dispersion's viscosity in centipoises.

TABLE II

| Dispersion Identification | DA-1 | DA-2 | DA-3 | DB-1 | DD-1 | DH-1 | DH-2 | DE-1 | DA-4 | DF-1 | DG-1 |
|---|---|---|---|---|---|---|---|---|---|---|---|
| Charge | | | | | | | | | | | |
| Blend A(1) | 80 | 80 | 80 | — | — | — | — | — | 80 | — | — |
| Blend B(1) | — | — | — | 80 | — | — | — | — | — | — | — |
| Blend D(1) | — | — | — | — | 80 | — | — | — | — | — | — |
| Blend H(1) | — | — | — | — | — | 80 | 80 | — | — | — | — |
| Blend E(1) | — | — | — | — | — | — | — | 80 | — | — | — |
| Blend F(1) | — | — | — | — | — | — | — | — | — | 80 | — |
| Blend G(1) | — | — | — | — | — | — | — | — | — | — | 80 |
| NaOH | 4 | — | — | — | — | — | — | — | — | — | — |
| KOH | — | 5.6 | — | — | — | — | — | — | — | — | — |
| 30% NH$_4$OH | — | — | 16.2 | 11.2 | 16.2 | 20 | 28 | 16.2 | 16.2 | 16.2 | 16.2 |
| DMAE(2) | — | — | 5.6 | 5.6 | 6.0 | 6 | 6 | 5.6 | 5.6 | 5.6 | 5.6 |
| n-Butanol | — | — | — | — | — | — | 45 | — | — | — | — |
| Water | 511 | 511 | 600 | 600 | 600 | 600 | 600 | 600 | 600 | 600 | 600 |
| Processing Conditions | | | | | | | | | | | |
| Time, hours | 1.5 | 1.5 | 0.75 | 2.0 | 2.5 | 4.5 | 3.0 | 1.0 | 1.0 | 1.0 | 1.0 |
| Temperature, °C. | 75–90 | 75–90 | 90–95 | 90–95 | 85–95 | 90–95 | 90–95 | 90–95 | 90–95 | 90–95 | 90–95 |
| Emulsion Properties | | | | | | | | | | | |
| Solids, % | 15.2 | 15.4 | 15.0 | 13.5 | 14.1 | 15 | 13.5 | 13.5 | 15.0 | 14.5 | 13.0 |
| pH | 9.8 | 10.1 | 9.4 | 9.3 | 9.3 | 9.7 | 9.9 | 10.1 | 10.0 | 10.2 | 10.2 |
| Viscosity, cps | 30 | 25 | 820 | 510 | 80 | 725 | 25 | 135 | 55 | 135 | 30 |

(1)Blend Identification shown in Table I
(2)DMAE = 2-Dimethylaminoethanol

An attempt to prepare a dispersion from 80 parts of Blend J (shown in Table I), 28 parts of 30% NH$_4$OH, 6 parts of DMAE, 25 parts of n-butanol, and 600 parts of water at a temperature range of 90°–95° C. in a 5-hour period was unsuccessful.

EXAMPLE 3

A series of coated articles were prepared by laying down coatings of the aqueous dispersions shown in Example 2 on a number of substrates, specifically, kraft paper, aluminum foil and low density polyethylene film.

Dispersions DE-1, DA-3, DH-1, and DH-2 were coated onto 40-pound kraft paper which was approximately 4 mils thick. The emulsions were applied at a level sufficient to provide a dry coating 0.5 mil thick. The coating was permitted to dry for several hours. The coating then was cured by heating for two minutes at 125° C. Aluminum foil 1 mil thick was coated in the same manner as described above with respect to kraft paper.

One mil film of low density polyethylene, the surface of which had been treated by Corona discharge, was coated with dispersions DE-1, DA-3, and DF-1. The coating method was identical to that previously described for the coating of kraft paper, except that final curing of the coating was carried out by heating for two minutes at 110° C.

A first series of laminates was prepared from the coated kraft paper by placing the coated sides of two sheets together and sealing the laminate by heating for 0.5 sec. under pressure of 40 psig at 138° C. A second series of laminates was prepared by placing the coated surface of one kraft sheet against the uncoated surface of a second kraft sheet and heat sealing under the conditions previously described.

Two series of laminates were prepared from the coated aluminum foil. The first series was prepared by placing the two coated surfaces together and sealing under the same conditions employed with the kraft paper laminates previously described. The second series was prepared by placing the coated side of one sheet of foil against the uncoated side of a second sheet of aluminum foil. The sealing conditions were the same as previously described.

Two series of laminates were prepared from the film of LDPE in the same manner as previously described, with the single exception that the sealing temperature employed was 110° C.

A final series of laminates was prepared by placing the coated surface of the LDPE film in contact with uncoated kraft paper and employing the sealing conditions previously described for preparing the laminates of LDPE film.

The seal strengths of the laminates were measured by pulling the laminates apart in an Instron machine operated at a cross-head speed of 2"/minute. The seal strengths are expressed in grams/inch per width. The data are set forth in Table III.

TABLE III

| Coating Dispersion Employed | DE-1 | DA-3 | DF-1 | DH-1 | DH-2 |
|---|---|---|---|---|---|
| Laminate Pairs Bonded | | | | | |
| Kraft coated/ Kraft coated | 810 | 858 | — | 362 | 203 |
| Kraft coated/ Kraft uncoated | 723 | 680 | — | — | — |
| Al. foil coated/ Al. foil coated | 770 | 588 | — | 203 | 135 |
| Al. foil coated/ Al. foil uncoated | 135 | 135 | — | — | — |
| LDPE coated/ LDPE coated | 497 | 497 | 406 | — | — |
| LDPE coated/ LDPE uncoated | 135 | 340 | 135 | — | — |
| LDPE coated/ Kraft uncoated | <106 | 225 | 130 | 135 | 195 |

What is claimed:

1. In a coextrusion process for preparing a composite polymer film construction having polymers in the two surface layers which are fusion-bonded to each other by an intermediate polymer layer in which three polymer streams are fed into three channels of a film die, and the three polymer streams flow into the film die and are extruded to form an extrudate in which the three polymer streams form a film having three fusion-bonded layers, the improvement which consists of employing an ethylene polymer or an isotactic propylene polymer as the polymer to form each of the two surface layers and employing to form the intermediate polymer layer a polymeric composition consisting essentially of an intimate fusion blend of;

a. 100 parts by weight of an ionomer resin, and b. about 5 to 900 parts by weight of an alkenyl succinic anhydride;

said ionomer resin being a metal salt of an ethylene-acid copolymer which is a copolymer of ethylene and acrylic or methacrylic acid having an acid content of about 1–10 mol % and having a high load melt index of at least about 1.0 and a normal load melt index of up to about 50; and said alkenyl succinic anhydride having the structure:

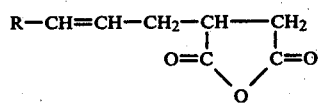

where R is an alkyl group containing about 13 to 49 carbon atoms.

* * * * *